United States Patent
Shah et al.

(10) Patent No.: US 10,338,928 B2
(45) Date of Patent: Jul. 2, 2019

(54) UTILIZING A STACK HEAD REGISTER WITH A CALL RETURN STACK FOR EACH INSTRUCTION FETCH

(75) Inventors: Manish K. Shah, Austin, TX (US); Zeid H. Samoail, Austin, TX (US)

(73) Assignee: Oracle International Corporation, Redwood Shores, CA (US)

(*) Notice: Subject to any disclaimer, the term of this patent is extended or adjusted under 35 U.S.C. 154(b) by 1500 days.

(21) Appl. No.: 13/112,428

(22) Filed: May 20, 2011

(65) Prior Publication Data

US 2012/0297167 A1 Nov. 22, 2012

(51) Int. Cl.
*G06F 9/00* (2006.01)
*G06F 9/38* (2018.01)
*G06F 9/30* (2018.01)

(52) U.S. Cl.
CPC ........ *G06F 9/3806* (2013.01); *G06F 9/30054* (2013.01); *G06F 9/30101* (2013.01); *G06F 9/3842* (2013.01)

(58) Field of Classification Search
CPC ... G06F 9/30101; G06F 9/3806; G06F 9/3842
USPC ................. 712/233, 239, 242, 243
See application file for complete search history.

(56) References Cited

U.S. PATENT DOCUMENTS

| | | | |
|---|---|---|---|
| 3,810,117 A * | 5/1974 | Healey | 711/3 |
| 4,459,659 A * | 7/1984 | Kim | 718/100 |
| 5,522,051 A * | 5/1996 | Sharangpani | G06F 7/785 |
| | | | 711/200 |
| 5,526,498 A | 6/1996 | Matsuo et al. | |
| 5,604,877 A | 2/1997 | Hoyt et al. | |
| 5,850,543 A * | 12/1998 | Shiell et al. | 712/238 |
| 5,881,278 A | 3/1999 | Tran et al. | |
| 5,954,816 A | 9/1999 | Tran et al. | |
| 5,964,868 A * | 10/1999 | Gochman et al. | 712/234 |
| 5,995,749 A | 11/1999 | Tran | |
| 6,108,774 A | 8/2000 | Muthusamy | |
| 6,253,315 B1 * | 6/2001 | Yeh | 712/238 |
| 6,269,436 B1 | 7/2001 | Tran et al. | |
| 6,789,171 B2 | 9/2004 | Desai et al. | |
| 6,898,699 B2 | 5/2005 | Jourdan et al. | |
| 6,973,563 B1 | 12/2005 | Sander | |
| 7,836,290 B2 | 11/2010 | Chaudhry et al. | |
| 7,975,132 B2 * | 7/2011 | Bean et al. | 712/234 |
| 8,250,349 B2 * | 8/2012 | Inoue | 712/242 |
| 8,423,751 B2 * | 4/2013 | Henry et al. | 712/233 |
| 2004/0230779 A1 | 11/2004 | Haghighat et al. | |
| 2006/0095675 A1 * | 5/2006 | Yang et al. | 711/132 |

(Continued)

OTHER PUBLICATIONS

"What's a Register?", Dec. 6, 2005, 5 pages.*

*Primary Examiner* — David J. Huisman
(74) *Attorney, Agent, or Firm* — Meyertons Hood Kivlin Kowert and Goetzel PC

(57) ABSTRACT

A processor, method, and medium for implementing a call return stack within a pipelined processor. A stack head register is used to store a copy of the top entry of the call return stack, and the stack head register is accessed by the instruction fetch unit on each fetch cycle. If a fetched instruction is decoded as a return instruction, the speculatively read address from the static register is utilized as a target address to fetch subsequent instructions and the address at the second entry from the top of the call return stack is written to the stack head register.

20 Claims, 8 Drawing Sheets

(56) References Cited

U.S. PATENT DOCUMENTS

2007/0061555 A1\* 3/2007 St. Clair et al. ............. 712/242
2010/0017586 A1 1/2010 Gelman et al.

\* cited by examiner

UTILIZING A STACK HEAD REGISTER WITH A CALL RETURN STACK FOR EACH INSTRUCTION FETCH

BACKGROUND OF THE INVENTION

Field of the Invention

The present invention relates generally to processors, and in particular to a processor, method, and medium for implementing an improved efficiency call return stack.

Description of the Related Art

As processors are deployed in increasing numbers and varieties of applications, increasing the execution speed of processors is desired. Pipelining is one approach used to increase the execution speed of a processor. Such a technique involves overlapping the execution of a number of instructions in the processor at a given time. The processor, such as a central processing unit (CPU), may include a data path divided into a number of stages where each stage can do one part of processing a different instruction in any given cycle. To extract the best performance out of a pipelined processor, the processor needs to be fed a constant stream of instructions. A pipelined processor may pre-fetch future instructions and bring them into an on-chip instruction cache.

The processor attempts to predict future instructions and fetch those instructions so that the instructions will be ready and available in the processor pipeline when the time comes to actually execute them. For instructions that execute sequentially, this is a simple process of fetching the instructions a few cycles in advance. However, for certain instructions, such as control transfer instructions (CTI's), knowing where to fetch the instructions from can be problematic. CALL and RETURN instructions are a class of CTI's which are used to enter and exit a subroutine. When a CTI is encountered, the processor must determine the target address of the CTI and begin fetching instructions at the target address rather than the next sequential address after the CTI. The pipeline stages that definitively determine the target address occur after the stages that fetch the instructions, and as a result, bubbles are created by CTI's.

Therefore, to decrease the occurrence of bubbles, pipelined processors may include a memory structure called a call return stack. The call return stack may be used to store return addresses when functions or subroutines have been called. The call return stack is a small buffer that caches return addresses in a last-in-first-out (LIFO) manner. When a function is called, the target of the call instruction is at the start of the function, which is static and easy to predict. However, when a return instruction is encountered at the end of the function, determining the proper address to return to is more challenging. The function may be called from several different places in the code, and so it is difficult to predict the target of the return instruction. Therefore, each time a call instruction is encountered, the corresponding return address is pushed onto the call return stack. Each time a return instruction is encountered, the return address at the top of the call return stack is popped and used as the predicted target address of the return instruction.

When an instruction fetch unit fetches an instruction, the opcode of the instruction has not yet been decoded. If the instruction is a return instruction, the processor will not be aware of this until a few cycles later. At that point, the pipeline would read the return address from the return stack. However, this would cause a delay in the pipeline because the return address was needed a few cycles earlier to keep the pipeline supplied with a constant stream of instructions. To avoid these bubbles in the instruction pipelines, the fetch unit may speculatively read the call return stack on every fetch, in case one of the instructions in the fetch bundle turns out to be a return instruction.

Therefore, it is common for the call return stack to be accessed on every fetch, which is typically every cycle. These frequent accesses of the call return stack increase the power consumption of the processor. Also, because the call return stack is read on every fetch and written to when a call instruction is encountered, the stack typically has two ports (one port for reads and one port for writes). The dual-ported call return stack takes up additional area that could be reduced if the call return stack only needed a single read/write port.

Therefore, a need exists in the art for a processor architecture with a more efficient call return stack and supporting logic. In view of the above, improved methods and mechanisms for implementing a call return stack are desired.

SUMMARY OF THE INVENTION

Various embodiments of processors, methods, and mediums for utilizing a call return stack and a stack head register are contemplated. In one embodiment, a first instruction may be fetched from an instruction cache by an instruction fetch unit (IFU). One or more clock cycles later, the IFU may detect that the first instruction is a call instruction. In response to detecting a call instruction, the IFU may determine a return address corresponding to the call instruction. Then, the return address may be written to the stack head register and the return address may be pushed onto the call return stack. The IFU may read the stack head register on every instruction fetch to obtain a speculative return address. The speculative return address may be utilized if it turns out that one of the fetched instructions is a return instruction. In one embodiment, the stack head register may be a single-entry flip-flop and the call return stack may be a last in first out (LIFO) memory structure. Additionally, the call return stack may be a static random-access memory (SRAM) array.

In various embodiments, the IFU may fetch a second instruction. As part of the fetch, the IFU may read the stack head register to obtain a speculative return address. One or more clock cycles later, the IFU may detect that the second instruction is a return instruction. In response to detecting that the second instruction is a return instruction, the IFU may utilize the speculative return address as a target address to fetch subsequent instructions. Also in response to detecting a return instruction, the address from the second from the top entry of the call return stack may be copied to the stack head register. Still further in response to detecting a return instruction, the call return stack pointer may be adjusted to point to the second from the top entry of the call return stack.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

Figure 1:
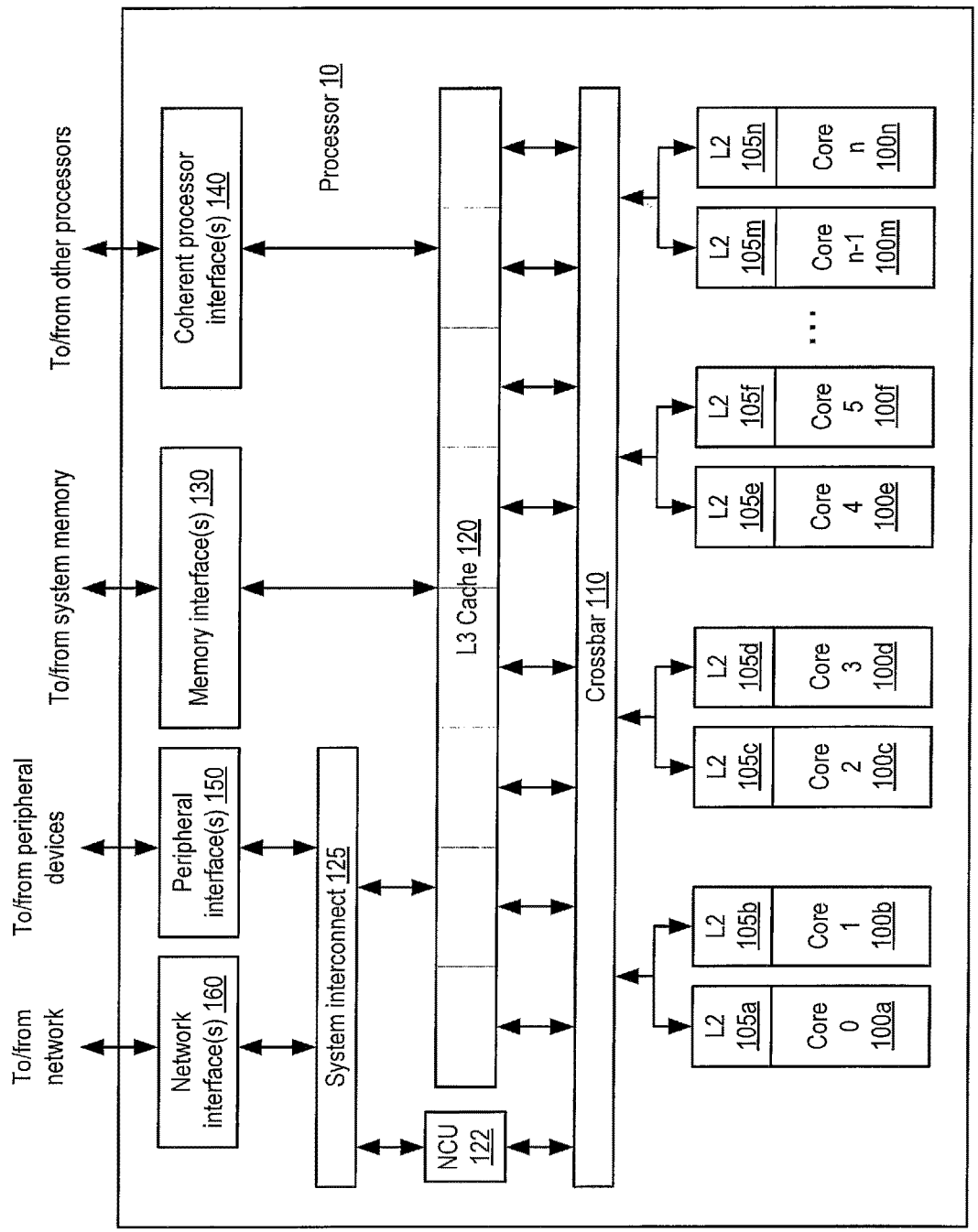
FIG. 1 is a block diagram that illustrates one embodiment of a multicore processor.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor unit . . . ." Such a claim does not foreclose the system from including additional components (e.g., a memory device, input device, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a multithreaded processor is shown. In the illustrated embodiment, processor 10 includes a number of processor cores 100*a-n*, which are also designated "core 0" though "core n." Various embodiments of processor 10 may include varying numbers of cores 100, such as 8, 16, or any other suitable number. Each of cores 100 is coupled to a corresponding L2 cache 105*a-n*, which in turn couple to L3 cache 120 via a crossbar 110. Cores 100*a-n* and L2 caches 105*a-n* may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC or MIPS, for example.

In the illustrated embodiment, each of cores 100 may be configured to operate independently of the others, such that all cores 100 may execute in parallel.

Additionally, as described below in conjunction with the description of FIG. 2, in some embodiments, each of cores 100 may be configured to execute multiple threads concurrently, where a given thread may include a set of instructions that may execute independently of instructions from another thread. For example, an individual software process, such as an application, may consist of one or more threads that may be scheduled for execution by an operating system. Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks. Also, L3 cache 120 may employ other bank sizes or cache geometries (e.g., different line sizes or degrees of set associativity). Furthermore, L3 cache 120 may employ write-through instead of writeback behavior. Still further, L3 cache 120 may or may not allocate on a write miss. Other variations of L3 cache 120 configuration are possible and contemplated.

In some embodiments, L3 cache 120 may implement queues for requests arriving from crossbar 110 and for results sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multi-ported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments, peripheral interface 150 may be configured to implement a version of Universal Serial Bus (USB) protocol or IEEE 1394 (Firewire) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
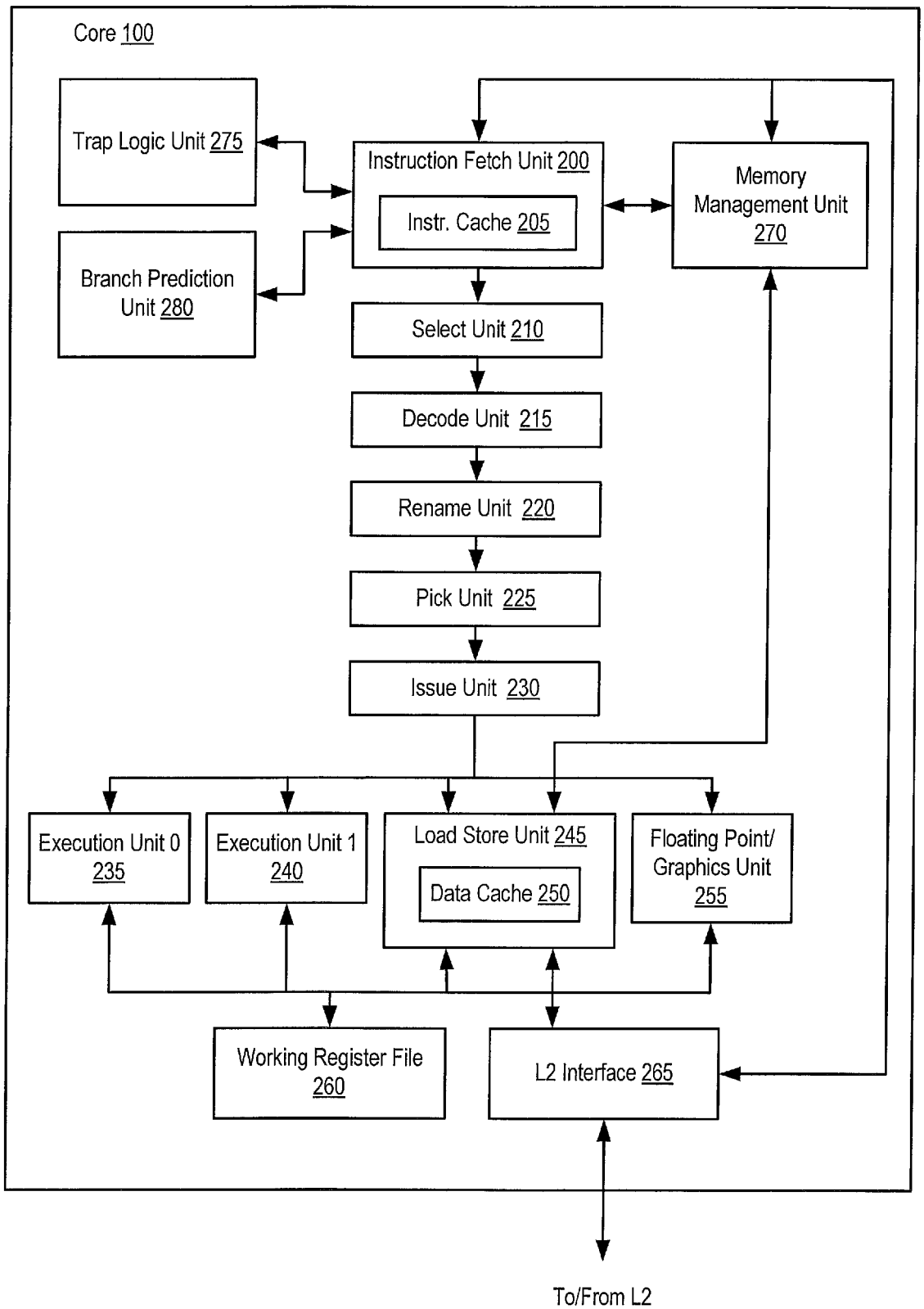
FIG. 2 is a block diagram that illustrates one embodiment of a processor core.

Turning now to FIG. 2, a block diagram of one embodiment of a processor core that may be configured to perform dynamic multithreading is illustrated. In the illustrated embodiment, core 100 includes an instruction fetch unit (IFU) 200 that includes an instruction cache 205. IFU 200 is coupled to a memory management unit (MMU) 270, L2 interface 265, trap logic unit (TLU) 275, and branch prediction unit 280. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270. It is noted that the illustrated partitioning of resources is merely one example of how core 100 may be implemented. Alternative configurations and variations are possible and contemplated. Core 100 may practice all or part of the recited methods, may be a part of a computer system, and/or may operate according to instructions in non-transitory computer-readable storage media.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and receive information from branch prediction unit 280 regarding predictions of the direction and target of CTI's (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection. Selection may occur first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. Branch prediction unit 280 may be configured to predict the direction and target of CTIs (or, in some embodiments, a subset of the CTIs that are defined for an ISA) in order to reduce the delays incurred by waiting until the effect of a CTI is known with certainty. In one embodiment, branch prediction unit 280 may be configured to implement a perceptron-based dynamic branch predictor, although any suitable type of branch predictor may be employed. In some embodiments, the functionality of branch prediction unit 280 may be implemented by IFU 200.

To implement branch prediction, branch prediction unit 280 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

If IFU 200 identifies a call instruction in a set of fetched instructions, then IFU 200 may be configured to write a return address corresponding to the call instruction to a stack head register (not shown) and a call return stack (not shown). In one embodiment, the stack head register and the call return stack may reside in branch prediction unit 280. In another embodiment, the stack head register and the call return stack may reside in IFU 200. In a further embodiment, the stack head register and the call return stack may reside in another location.

The return address corresponding to the call instruction may be the address of the instruction that follows the call instruction or may be the address of another instruction that is to be executed after the procedure being called is completed. When a call instruction is detected, the target return address of the corresponding return instruction may be computed and may be saved in the stack head register as well as being pushed onto call return stack. The stack head register may be read on every instruction fetch in case one of the fetched instructions turns out to be a return instruction. The speculatively read address from the stack head register may be utilized for future fetches if a return instruction is actually encountered, and otherwise, the speculatively read address may be discarded. When a function or subroutine finishes, and a return instruction is detected, the address in the second entry from the top of the call return stack may be copied to the stack head register, to ensure that the stack head register holds a copy of the target address of the next return instruction.

A method for implementing a more efficient version of a call return stack may be carried out by core 100. The method may comprise storing a first return address on the call return stack and storing the first return address in a stack head register in response to detecting a first call instruction. Then, the first return address may be speculatively read from the stack head register in response to IFU 200 fetching another instruction. The speculatively read first return address may be discarded after decoding the instruction and determining the instruction is not a return instruction. If it is determined that the fetched instruction is a return instruction, then additional instructions may be fetched at the first return address.

The method may further comprise storing a second return address in the stack head register and on the call return stack in response to detecting a second call instruction. The first return address that was previously in the stack head register may be overwritten by the second return address. The call return stack pointer may be incremented to point to the second return address after the second return address is pushed onto the call return stack. Then, another instruction may be fetched and decoded. The second return address may be speculatively read from the stack head register as part of the fetch. In response to determining the fetched instruction is a return instruction, the program counter may be updated to point to the second return address and the first return address may be copied from the second from the top entry on the call return-stack to the stack head register. The call return stack pointer may be adjusted to point to the first return address (whereas previously the call return-stack pointer was pointing to the second return address).

By predicting return addresses for fetched return instructions, processor core 100, in many instances, may be able to achieve greater instruction throughput than other multi-threaded processor cores because core 100 may begin fetching instructions using a predicted return address instead of stalling while a return instruction executes and its return address is retrieved.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215. Thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation for load/store instructions executed by LSU 245. EXU1 240 may be configured to execute integer instructions issued from slot 1, as well as branch instructions. In one embodiment, FGU instructions and multi-cycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments, execution units 235-240 may not be bound to specific issue slots, or may be differently bound than just described.

LSU 245 may be configured to process data memory references, such as integer and floating-point load and store instructions and other types of memory reference instructions. LSU 245 may include a data cache 250 as well as logic configured to detect data cache misses and to responsively request data from an L2 cache via L2 interface 265. In one embodiment, data cache 250 may be configured as a set-associative, write-through cache in which all stores are written to an L2 cache regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data translation lookaside buffer (TLB) to cache virtual data address translations, as well as load and store buffers configured to store issued but not-yet-committed load and store instructions for the purposes of coherency snooping and dependency checking LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking LSU 245 may also include hardware configured to support atomic load-store instructions, memory-related exception detection, and read and write access to special-purpose registers (e.g., control registers).

Floating point/graphics unit (FGU) 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to an L2 cache in response to their respective cache misses. Additionally, MMU 270 may be configured to generate memory requests, for example while executing a page table walk. In the illustrated embodiment, L2 interface 265 may be configured to provide a centralized interface to the L2 cache associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to the L2 cache during a given execution cycle. For example, L2 interface 265 may implement a least-recently-used or other algorithm to arbitrate among L2 requestors. In one embodiment, L2 interface 265 may also be configured to receive data returned from the L2 cache, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit (TLU) 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program order) complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing as a result of branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Figure 3:
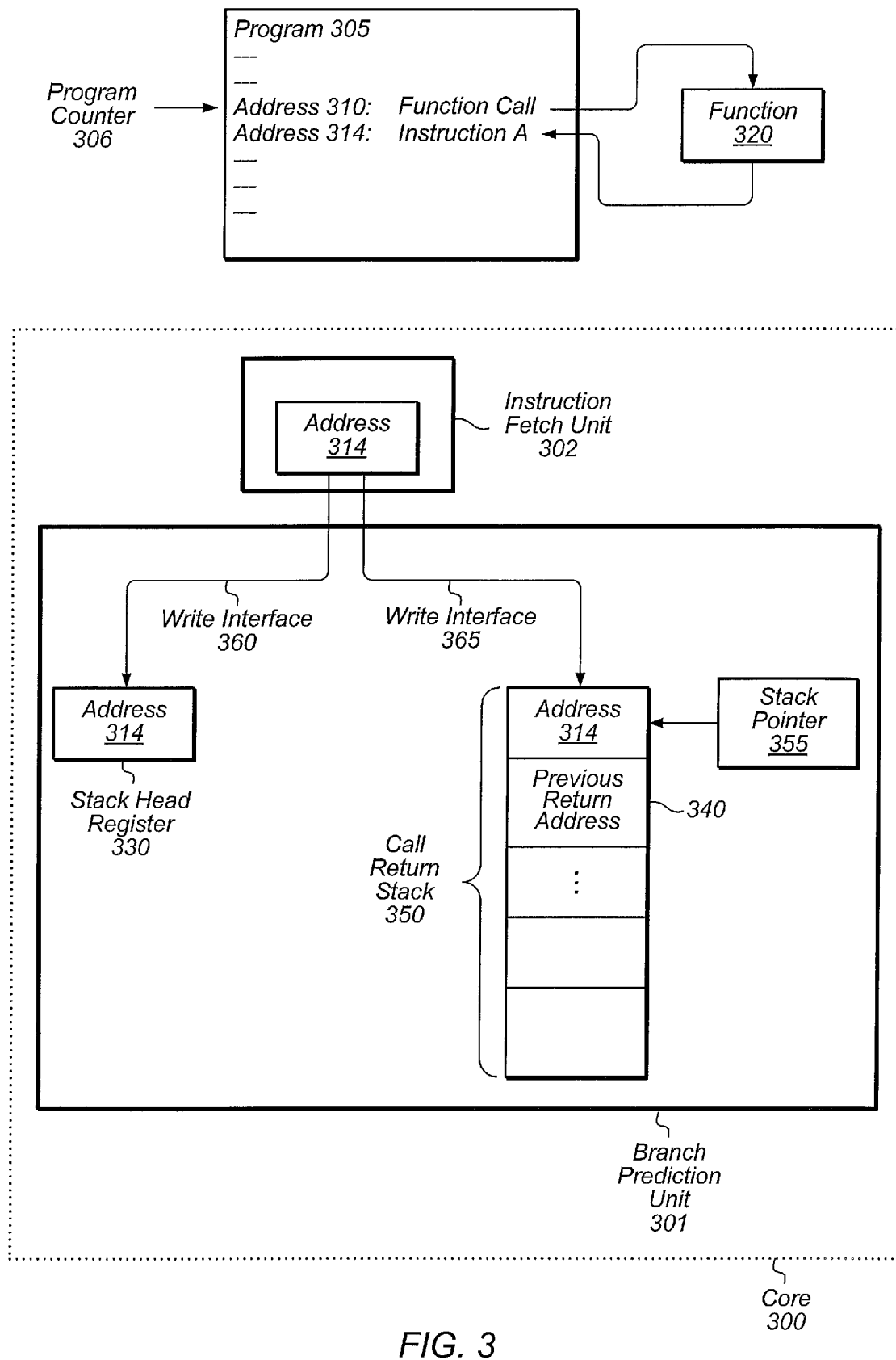
FIG. 3 illustrates one embodiment of program code and a processor core.

Referring now to FIG. 3, one embodiment of a program and a processor core are shown. Program 305 is shown at the top of FIG. 3, and program 305 may be executed by processor core 300. Core 300 may include a plurality of various components, including branch prediction unit 301 and instruction fetch unit (IFU) 302. It is noted that core 300, branch prediction unit 301, and IFU 302 may each include a variety of other components/structures not shown in FIG. 3.

In one embodiment, a dedicated one-entry register may be allocated in branch prediction unit 301. The register may be referred to as a stack head register, and stack head register 330 may be configured to store a most recent return address. Generally speaking, stack head register 330 may hold a copy of the address (i.e., the target address of the next return instruction) that's stored at the top of call return stack 350. Call return stack 350 may store a plurality of return addresses, including address 314 and previous return address 340. In one embodiment, call return stack 350 may be a last in first out (LIFO) memory structure. In other embodiments, call return stack 350 may be implemented as a linked list data structure, wherein the top return address (i.e., address 314) may indicate where the next return address (i.e., previous return address 340) is stored, and wherein each return address of stack 350 may include a link to where the next return address is stored. Other types of data structures are possible and are contemplated as well.

Stack head register 330 may be a static flip-flop holding a static value of the most recent return address. In various embodiments, stack head register 330 and call return stack 350 may be configured to store addresses corresponding to jump instructions, branch instructions, or other CTI's. In some embodiments, branch prediction unit 301 may include a plurality of stack head registers and a plurality of call return stacks. Branch prediction unit 301 may include a stack head register and a call return stack for each thread of a plurality of threads executing on core 300. For example, in one embodiment, branch prediction unit 301 may include eight stack head registers and eight call return stacks for eight separate threads. In another embodiment, branch prediction unit 301 may include a call return stack that is shared by a plurality of separate threads. In other embodiments, the components and functionality of branch prediction unit 301 may be incorporated within IFU 302.

As shown in FIG. 3, program 305 may include a plurality of instructions, which may be executed by core 300. As program 305 executes, program counter 306 will eventually reach address 310 and a function call instruction. The function call will cause the program execution to be transferred to function 320. When the call instruction at address 310 is fetched and decoded, the corresponding return address may be calculated, which in this case is address 314. In other embodiments, a delay or nop instruction may be executed after a call instruction. In those embodiments, the address following the delay or nop instruction may be written to stack head register 330 and pushed onto call return stack 350.

After the return address (i.e., address 314) is calculated, address 314 may be written to stack head register 330 via write interface 360 and address 314 may be pushed onto call return stack 350 via write interface 365, as shown in FIG. 3. Additionally, stack pointer 355 of call return stack 350 may be incremented to point to address 314. In one embodiment, stack head register 330 and call return stack 350 may be updated with address 314 at the same time. In another embodiment, address 314 may be pushed onto call return stack 350, and then address 314 may be copied from call return stack 350 to stack head register 330. In a further embodiment, address 314 may be written to stack head register 330, and then address 314 may be copied from stack head register 330 to call return stack 350.

In various embodiments, IFU 302 may fetch instructions from an instruction cache (not shown). The one or more instructions that are fetched by IFU 302 during a single fetch operation may be referred to as a fetch bundle. When instructions are fetched by IFU 302, the instructions may not be immediately decoded. It is possible that a fetched instruction is a return instruction, but IFU 302 may not recognize this for one or more clock cycles after the fetch. Therefore, to avoid this delay, a speculative return address may be read from stack head register 330 each time IFU 302 fetches one or more instructions. The speculative return address from stack head register 330 may be utilized as a target address of a subsequent fetch if it turns out a return instruction is detected in the current fetch bundle. Also, if a return instruction is detected, the entry positioned below the top entry in call return stack 350 may be written to stack head register 330. Call return stack 350 may only be accessed on encountered calls and returns instead of speculative calls and returns, which may reduce the number of accesses to call return stack 350.

By reducing the number of accesses to call return stack 350, the possibility of reading and writing call return stack 350 in the same cycle may be eliminated. Therefore, since call return stack 350 is not utilized for speculative reads, call return stack 350 may only contain a single port for reading and writing. Utilizing a single port as compared to utilizing multiple ports may reduce the power consumption of call return stack 350 and may reduce the silicon area allocated to call return stack 350. In some cases, it may be possible to encounter a call and a return in the same fetch bundle, but typically after the call instruction (if the call is first) or the return instruction (if the return is first), the rest of the fetch bundle may be discarded. In various embodiments, after the first taken branch in a fetch bundle, the other instructions in the bundle may be thrown away because the taken branch will take execution to a new section of code.

In some embodiments, processor core 300 may determine whether a fetch bundle includes call instructions based on decode information stored in an instruction cache (not shown). In one embodiment, upon identifying a first call instruction, IFU 302 may provide a return address for the call instruction to stack head register 330 and call return stack 350. If multiple call instructions are identified in the fetch bundle, IFU 302 may process the call instruction that occurs first and not process the other call instructions.

IFU 302 may be configured to fetch instructions that are to be executed in the pipeline of processor core 300. In various embodiments, IFU 302 may be configured to function in a similar manner to that of IFU 200 described above. In one embodiment, IFU 302 may be configured to select a thread during a given fetch cycle and to fetch one or more instructions in that thread from an instruction cache. In some embodiments, IFU 302 may be configured to fetch a block of multiple instructions in multiple threads. In one embodiment, as IFU 302 fetches instructions, IFU 302 may be configured to use prediction information provided by branch prediction unit 301 to facilitate the fetching of instructions. In some embodiments, this prediction information may include predicted branch directions, predicted target addresses, loop prediction information, etc.

Figure 4:
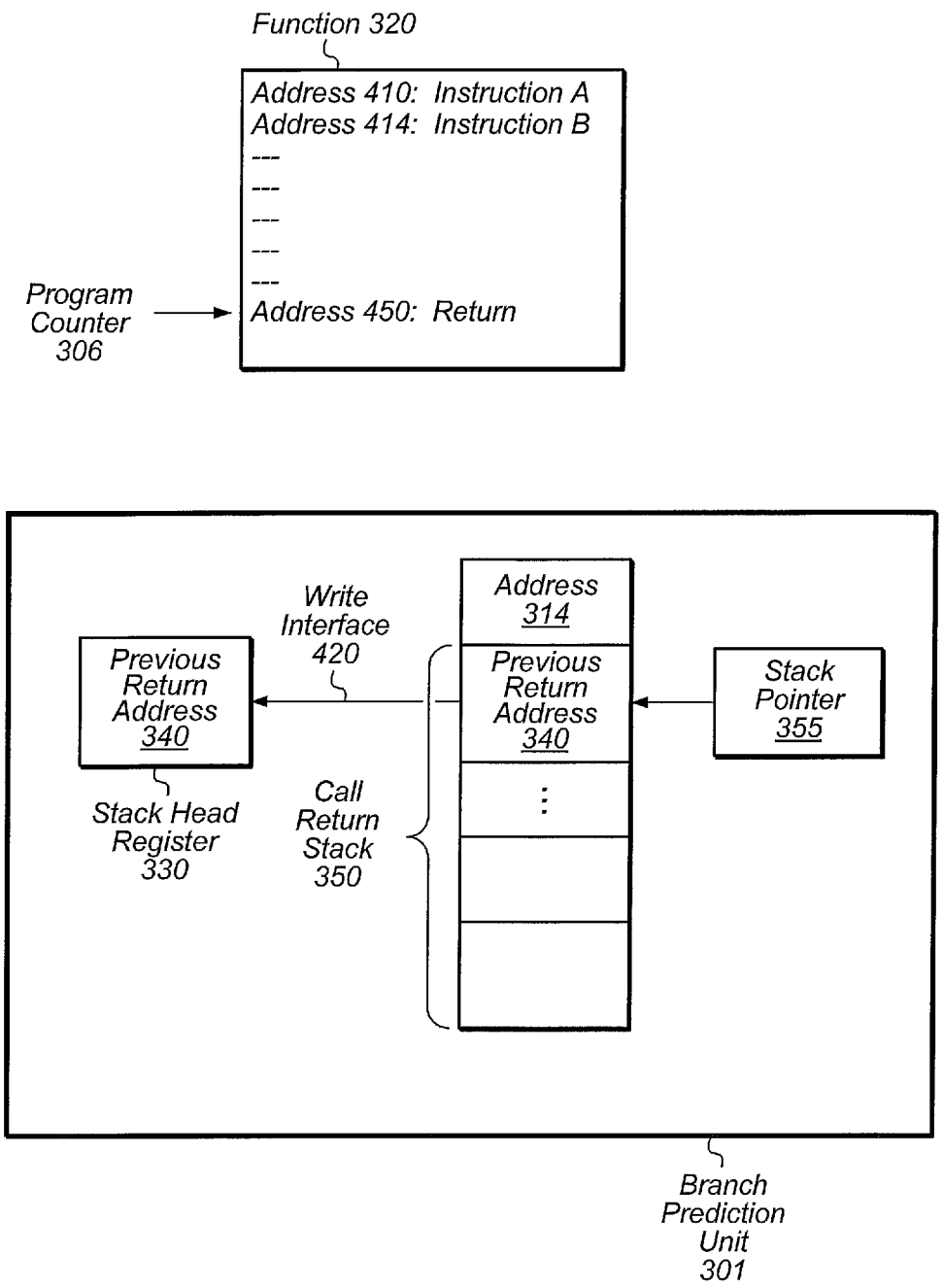
FIG. 4 illustrates a call return stack and a stack head register after a return instruction is detected in accordance with one or more embodiments.

Turning now to FIG. 4, one embodiment of a function 320 and a branch prediction unit 301 is shown. Function 320 is shown at the top of FIG. 4, and function 320 may include a plurality of instructions. Instruction A (address 410) and instruction B (address 414) may be executed, and then one or more additional instructions may be executed in function 320. At the end of function 320, program counter 306 may point to address 450, and a return instruction may be executed. When the return instruction at address 450 is encountered, the second from the top entry of call return stack 350 may be written via write interface 420 to stack head register 330. Additionally, stack pointer 355 may be adjusted so that it points to the second from the top entry (i.e., previous return address 340). Therefore, after the return instruction is executed, the previous return address 340 may become the new top entry of the stack. In one embodiment, call return stack 350 may be configured to reset a valid bit (not shown) to indicate that the entry corresponding to address 314 is no longer allocated.

In various embodiments, the original top entry of the stack (i.e., address 314) may still reside in the same memory location, but the location may no longer be considered valid. At this point, if a call instruction were encountered in a fetch bundle, the calculated return address may be written to the same location as the original top of the stack (i.e., address 314) and then stack pointer 355 may be updated to point to that stack location. In one embodiment, call return stack 350 may deallocate an entry of a return address when the corresponding return instruction is executed. In general, call return stack 350 may be configured to deallocate entries that store old return addresses (e.g., by decrementing an identifier).

Call return stack 350 is one embodiment of a memory that is configured to store return addresses. In some embodiments, call return stack 350 may be implemented using a static random access memory (SRAM). In other embodiments, call return stack 350 may be implemented using a dynamic random access memory (DRAM). Call return stack 350 may include a single port for write and read accesses.

In various embodiments, call return stack 350 may store return addresses for a plurality of threads. Call return stack 350 may be configured to concurrently store return addresses in a return address stack that has dynamically allocable entries (i.e., entries that can be allocated to store return addresses of different threads). In one embodiment, call return stack 350 may include a thread identifier for each stored return address. In such an embodiment, call return stack 350 may be implemented as a linked list structure, wherein each entry on the stack points to the next entry on the stack. In other embodiments, call return stack 350 may include multiple separate portions, and call return stack 350 may be configured to concurrently store return addresses within multiple portions dedicated to different threads.

In one embodiment, call return stack 350 may be statically partitioned to accommodate a plurality of threads. For example, in an embodiment with eight threads executing on core 300, call return stack 350 may be partitioned into multiple partitions—each being usable by a thread. For example, if call return stack 350 included 128 entries, it may be partitioned such that thread 0 uses entries 0-15, thread 1 uses entries 16-31, and so on. It is noted that other numbers of threads and call return stack entries may be utilized. In other embodiments, call return stack 350 may be dynamically partitioned such that some threads may use more entries than other threads based on the requirements of the program(s) running on the various threads. These and other embodiments are possible and are contemplated.

In various embodiments, stack head register 330 and call return stack 350 may be updated speculatively when a branch or return instruction is encountered in the fetch unit. At some point, the processor core may decide to perform a flush because a previous branch was mispredicted or an interrupt occurred. In that case, everything that was done speculatively may need to be thrown away. Call return stack 350 may be restored to a state that is synchronized with instructions that were actually committed. In various embodiments, two or more copies of stack pointer 355 per thread may be utilized, and one of the copies may be a speculative copy. The speculative copy may be updated as call and return instructions are encountered in the fetch unit. A second copy of stack pointer 355 may be a committed copy of the pointer, and the second copy may be updated when an actual call or return instruction is committed. In response to a pipeline flush, stack head register 330 may be updated with a copy of the address at the new top entry of call return stack 350.

For example, in one thread, a call instruction may be encountered, and the speculative copy of stack pointer 355 corresponding to that thread may be updated, but the committed copy of stack pointer 355 corresponding to that thread may not be updated. The call instruction may get executed by the processor, and then if the call instruction makes it to commit where the instruction is completed, then the committed copy of stack pointer 355 may be updated. If a flush is required, then the committed copy of stack pointer 355 may be stored onto the speculative copy. When the speculative copy of stack pointer 355 is overwritten by the committed copy, then stack head register 330 may be updated with the value pointed to by the committed copy of stack pointer 355.

Figure 5:
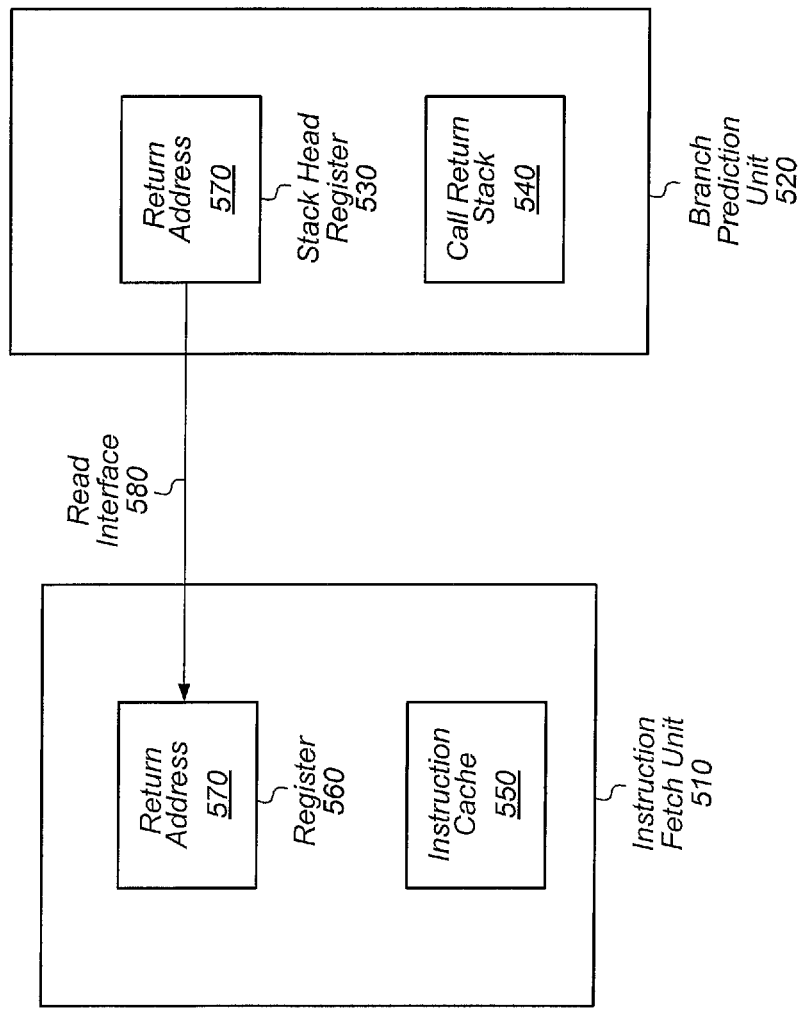
FIG. 5 is a block diagram illustrating one embodiment of an instruction fetch unit and a branch prediction unit.

Referring now to FIG. 5, a block diagram illustrating one embodiment of an instruction fetch unit and a branch prediction unit is shown. Instruction fetch unit (IFU) 510 may include register 560 and instruction cache 550. Branch prediction unit 520 may include stack head register 530 and call return stack 540. As part of supplying one or more execution units (not shown) with a steady supply of instructions, IFU 510 may fetch instructions from instruction cache 550 on a regular basis. On each cycle in which IFU 510 fetches one or more instructions from instruction cache 550, IFU 510 may also read a speculative return address (i.e., return address 570) from stack head register 530 via read interface 580. IFU 510 may store the speculative return address in a temporary location, such as register 560. In other embodiments, IFU 510 may store the speculative return address in an alternate location.

If IFU 510 or a decode unit (not shown) detects that one of the instructions fetched by IFU 510 is a return instruction or other instruction requiring access to a return address, IFU 510 may utilize the speculative return address stored in register 560 as the target of a subsequent fetch operation. Otherwise, if none of the instructions in the current fetch bundle is a return instruction, then IFU 510 may discard the speculative return address stored in register 560, or IFU 510 may overwrite the address stored in register 560 with the next speculative read of stack head register 530.

Figure 6:
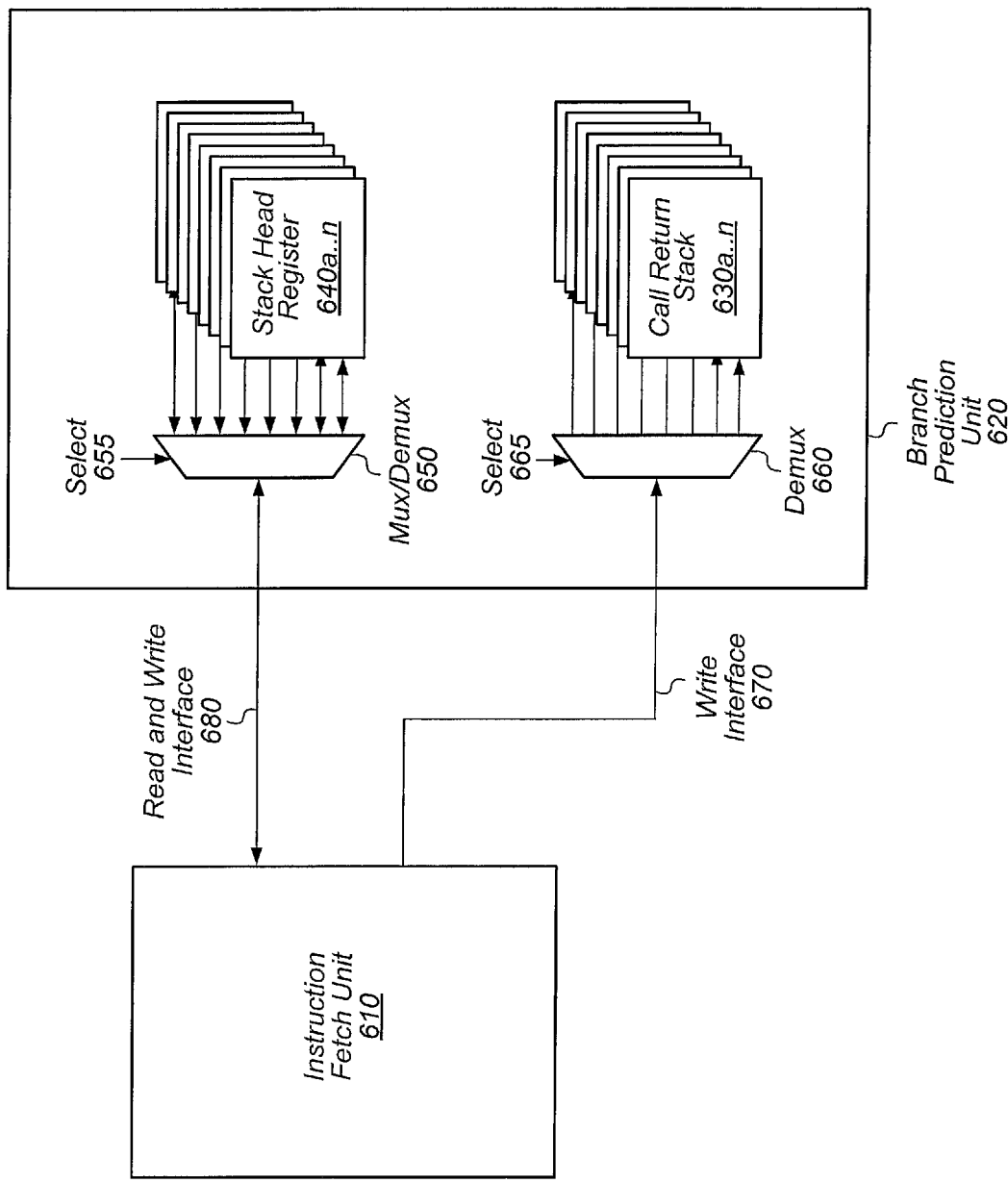
FIG. 6 is a block diagram illustrating one embodiment of a branch prediction unit with a plurality of stack head registers and call return stacks.

Referring now to FIG. 6, a block diagram of one embodiment of a branch prediction unit with a plurality of stack head registers and call return stacks is shown. Branch prediction unit 620 may be coupled to instruction fetch unit (IFU) 610, and both units may be part of a multi-threaded processor (not shown). Each thread of the multi-threaded processor may utilize a separate stack head register 640a-n and a separate call return stack 630a-n.

IFU 610 may utilize read and write interface 680 to access stack head register 640a-n via multiplexer/demultiplexer 650. IFU 610 may also utilize write interface 670 to write to call return stack 630a-n via demultiplexer 660. The select 655 signal of multiplexer/demultiplexer 650 may be utilized to select the stack head register 640 corresponding to the thread being handled by IFU 610. Also, the select 665 signal of demultiplexer 660 may be utilized to select the call return stack 630 corresponding to the thread being processed by IFU 610. Stack head register 640a-n is representative of any number of stack head registers and call return stack 630a-n is representative of any number of call return stacks. In one embodiment, there may be a stack head register 640 and call return stack 630 for each thread of the multi-threaded processor. In another embodiment, a single call return stack may be shared by a plurality of threads, wherein each return entry stored on the call return stack may include an identifier of the corresponding thread. As mentioned above, the shared call return stack may be statically or dynamically shared between the plurality of threads.

Figure 7:
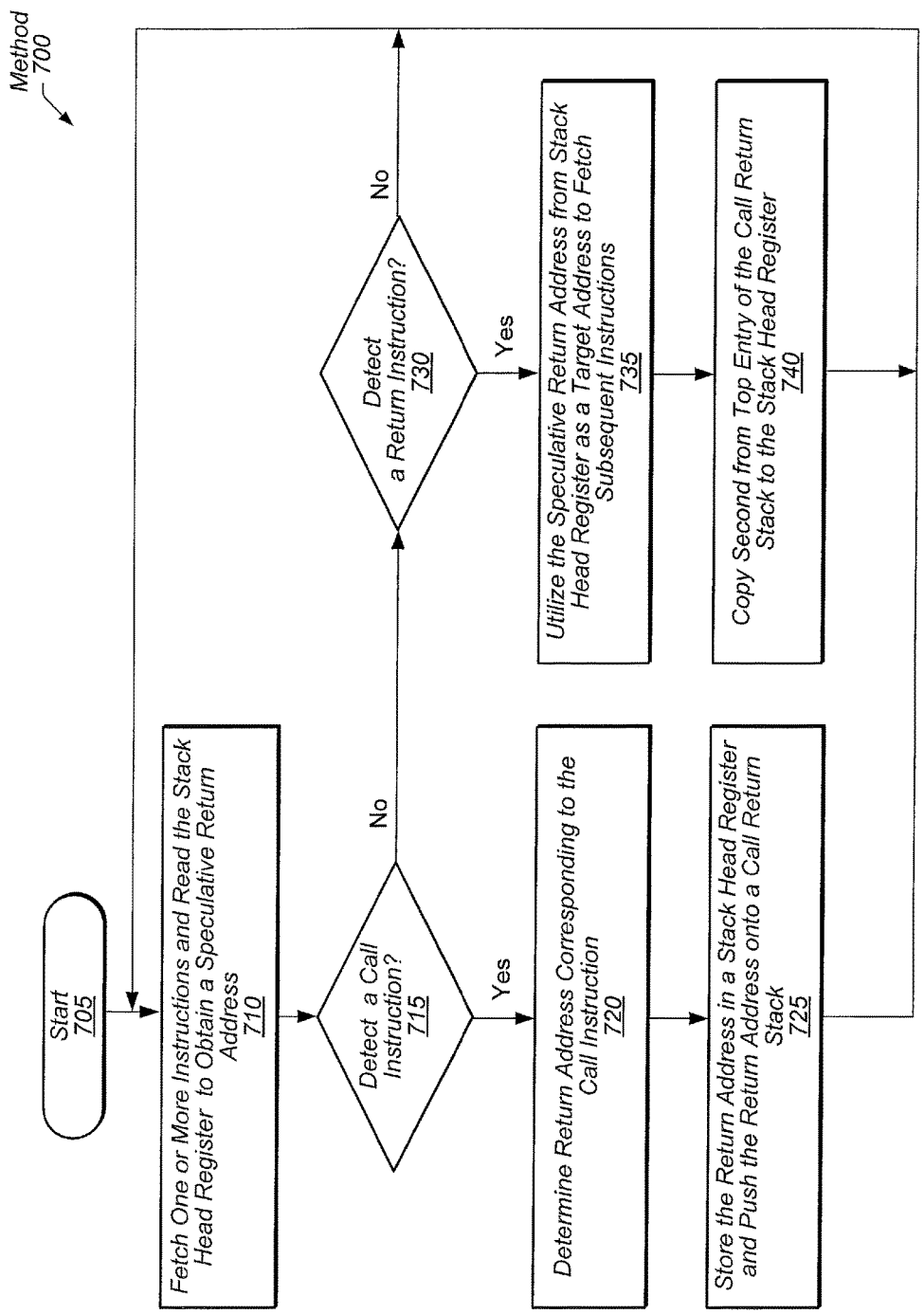
FIG. 7 is a generalized flow diagram illustrating one embodiment of a method for utilizing a stack head register and a call return stack.

Turning now to FIG. 7, one embodiment of a method for utilizing a stack head register and call return stack is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

Method 700 starts in block 705, and then an instruction fetch unit (IFU) may fetch one or more instructions and read the stack head register to obtain a speculative return address (block 710). The IFU may not know the instruction type of the instruction(s) immediately after fetching the instruction(s). The IFU or a decode unit may then decode the instruction(s) one or more clock cycles later and detect that one of the instructions is a call instruction (conditional block 715).

In response to detecting a call instruction, the IFU may determine a return address corresponding to the call instruction (block 720). In some embodiments, the return address may be the next sequential address after the address of the call instruction. After block 720, the return address may be stored in a stack head register and pushed onto a call return stack (block 725). Also, the call return stack pointer may be updated to point to the top entry of the stack containing the return address. In various embodiments, the call return stack may be implemented as a linked list structure, wherein each address on the stack points to the next address on the stack. In one embodiment, the stack head register and the call return stack may be included within a branch prediction unit. In another embodiment, the stack head register and the call return stack may be included within the IFU. In a further embodiment, the stack head register and the call return stack may reside in different locations. After block 725, the IFU may return to block 710 and fetch additional instructions on subsequent clock cycles.

If the IFU does not detect a call instruction, the IFU may detect a return instruction from the one or more fetched instructions (conditional block 730). If the IFU does not detect a return instruction (conditional block 730), then the IFU may return to block 710 and fetch additional instructions on subsequent clock cycles. In response to detecting a return instruction, the IFU may utilize the speculative return address from the stack head register as a target address to fetch subsequent instructions (block 735). Also in response to detecting a return instruction, an address from a second from a top entry of the call return stack may be copied to the stack head register (block 740). After block 740, method 700 may return to block 710 for additional instruction fetches. Method 700 may be performed a plurality of times for a plurality of fetch cycles and may include any number of call and return instructions.

Figure 8:
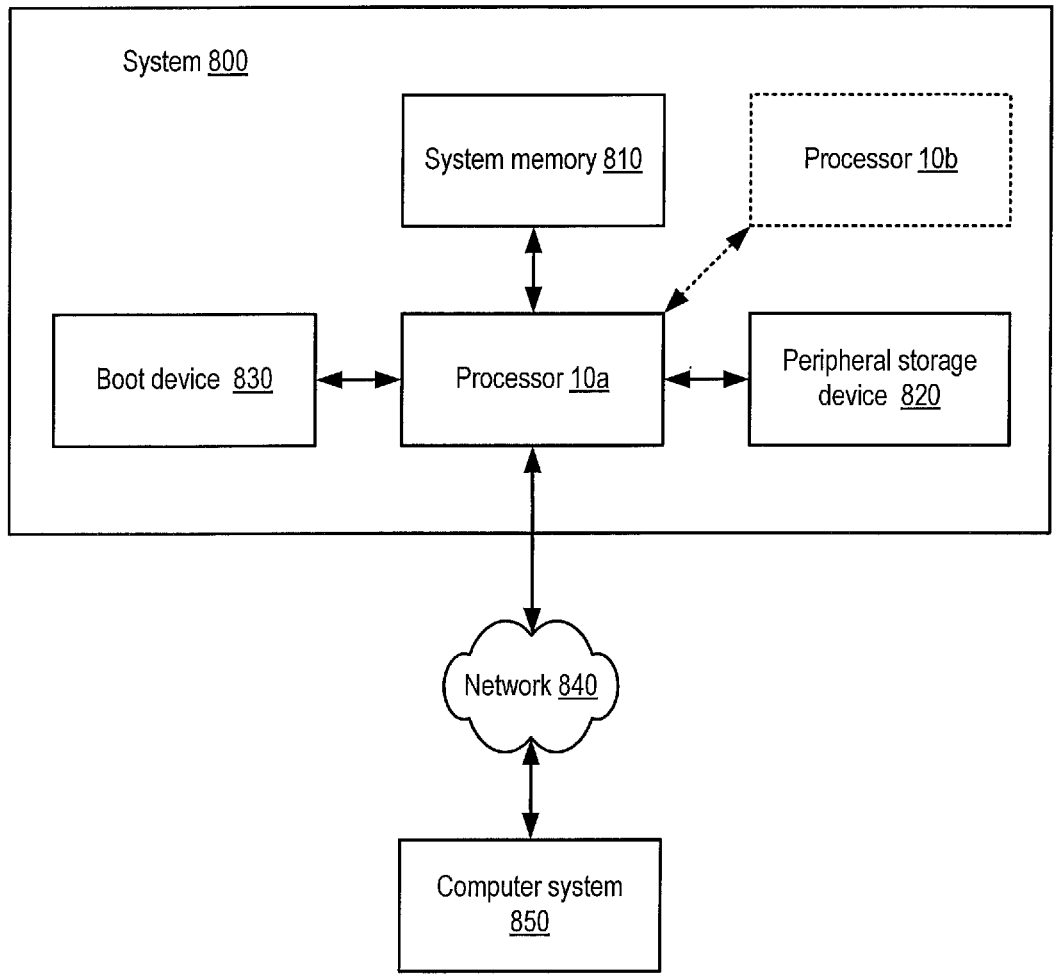
FIG. 8 is a block diagram illustrating one embodiment of a system including a processor.

Referring now to FIG. 8, a block diagram of one embodiment of a system including a processor is shown. In the illustrated embodiment, system 800 includes an instance of processor 10, shown as processor 10a, that is coupled to a system memory 810, a peripheral storage device 820 and a boot device 830. System 800 is coupled to a network 840, which is in turn coupled to another computer system 850. In some embodiments, system 800 may include more than one instance of the devices shown. In various embodiments, system 800 may be configured as a rack-mountable server system, a standalone system, or in any other suitable form factor. In some embodiments, system 800 may be configured as a client system rather than a server system.

In some embodiments, system 800 may be configured as a multiprocessor system, in which processor 10a may optionally be coupled to one or more other instances of processor 10, shown in FIG. 8 as processor 10b. For example, processors 10a-b may be coupled to communicate via their respective coherent processor interfaces.

In various embodiments, system memory 810 may comprise any suitable type of system memory as described above, such as FB-DIMM, DDR/DDR2/DDR3/DDR4

SDRAM, or RDRAM®, for example. System memory 810 may include multiple discrete banks of memory controlled by discrete memory interfaces in embodiments of processor 10 that provide multiple memory interfaces. Also, in some embodiments, system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 820 may be coupled to processor 10 via peripheral interface(s) 150 of FIG. 1.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be configured in a substantially different manner. For example, computer system 850 may be a server system, a processor-based client system, a stateless "thin" client system, a mobile device, etc. In some embodiments, processor 10 may be configured to communicate with network 840 via network interface(s) 160 of FIG. 1.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any non-transitory storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method comprising:
   fetching a first instruction; and
   in response to detecting the first instruction is a call instruction based on decode information generated from an opcode fetched with the first instruction:
     determining a first return address corresponding to the call instruction;
     storing the first return address in a stack head register; and
     pushing the first return address onto a call return stack that is separate from the stack head register; and
   on every instruction fetch:
     reading the stack head register to obtain a speculative return address stored therein; and
     storing the speculative return address in a temporary storage location prior to determining whether a corresponding fetched instruction comprises a return instruction.

2. The method as recited in claim 1, further comprising:
   fetching a second instruction;
   in response to determining the second instruction is a return instruction:
     utilizing the speculative return address stored in the temporary storage location as a target address to fetch subsequent instructions; and
     copying an address from a second most recent entry of the call return stack to the stack head register.

3. The method as recited in claim 2, further comprising ensuring the stack head register holds a copy of an address stored at the top of the call return stack on every instruction fetch.

4. The method as recited in claim 3, wherein the stack head register is a single-entry flip-flop, and wherein the call return stack comprises only a single port used for both reading and writing.

5. The method as recited in claim 3, further comprising detecting the second instruction is a return instruction one or more clock cycles subsequent to fetching the second instruction.

6. The method as recited in claim 1, wherein, in response to detecting the first instruction is the call instruction, the method further comprises:
   updating a speculative copy of a stack pointer to point to a location on the call return stack storing the first return address; and
   waiting until the call instruction has been committed before updating a committed copy of a stack pointer to point to the location on the call return stack storing the first return address.

7. The method as recited in claim 1, further comprising:
   discarding the speculative return address corresponding to a given instruction fetch of said every instruction fetch if the given instruction fetch does not include a return instruction; and
   not accessing the call return stack if it is determined that the given instruction fetch does not include a call or return instruction.

8. A processor comprising:
an instruction fetch unit comprising circuitry; and
a branch prediction unit, wherein the branch prediction unit is coupled to the instruction fetch unit, and wherein the branch prediction unit comprises a stack head register and a call return stack;
wherein the circuitry of the instruction fetch unit is configured to:
fetch a first instruction;
in response to detecting the first instruction is a call instruction based on decode information, generated from an opcode, fetched with the first instruction:
determine a first return address corresponding to the call instruction;
store the first return address in the stack head register; and
push the first return address onto the call return stack that is separate from the stack head register; and
on every instruction fetch:
read the stack head register to obtain a speculative return address stored therein; and
store the speculative return address in a temporary storage location prior to determining whether a corresponding fetched instruction comprises a return instruction.

9. The processor as recited in claim 8, wherein the circuitry of the instruction fetch unit is further configured to:
fetch a second instruction; and
in response to determining the second instruction is a return instruction, utilize the speculative return address stored in the temporary storage location as a target address to fetch subsequent instructions; and
wherein the branch prediction unit further comprises circuitry, wherein, in response to detecting the second instruction is a return instruction, the circuitry of the branch prediction unit is configured to copy an address from a second most recent entry of the call return stack to the stack head register.

10. The processor as recited in claim 9, further comprising circuitry configured to ensure the stack head register holds a copy of an address stored at the top of the call return stack on every instruction fetch.

11. The processor as recited in claim 10, wherein the stack head register is a single-entry flip-flop, and wherein the call return stack comprises only a single port used for both reading and writing.

12. The processor as recited in claim 10, wherein the fetch unit is configured to detect that the second instruction is a return instruction one or more clock cycles subsequent to fetching the second instruction.

13. The processor as recited in claim 8, wherein, in response to detecting the first instruction is the call instruction, the processor is further configured to:
update a speculative copy of a stack pointer to point to a location on the call return stack storing the first return address; and
wait until the call instruction has been committed before updating a committed copy of a stack pointer to point to the location on the call return stack storing the first return address.

14. The processor as recited in claim 8, wherein the processor is further configured to:
discard the speculative return address corresponding to a given instruction fetch of said every instruction fetch if the given instruction fetch does not include a return instruction; and
not access the call return stack if it is determined that the given instruction fetch does not include a call or return instruction.

15. A non-transitory computer readable storage medium comprising program instructions, wherein, when executed, the program instructions are operable to:
in response to detecting a first instruction is a call instruction based on decode information, generated from an opcode, fetched with the first instruction:
determine a first return address corresponding to the call instruction;
store the first return address in a stack head register; and
push the first return address onto a call return stack that is separate from the stack head register; and
on every instruction fetch:
read the stack head register to obtain a speculative return address stored therein; and
store the speculative return address in a temporary storage location prior to determining whether a corresponding fetched instruction comprises a return instruction.

16. The non-transitory computer readable storage medium as recited in claim 15, wherein the program instructions are further operable to:
fetch a second instruction; and
in response to determining the second instruction is a return instruction:
utilize the speculative return address stored in the temporary storage location as a target address to fetch subsequent instructions; and
copy an address from a second most recent entry of the call return stack to the stack head register.

17. The non-transitory computer readable storage medium as recited in claim 16, wherein the program instructions are further operable to ensure the stack head register holds a copy of an address stored at the top of the call return stack on every instruction fetch.

18. The non-transitory computer readable storage medium as recited in claim 17, wherein the stack head register is a single-entry flip-flop, and wherein the call return stack comprises only a single port for reading and writing.

19. The non-transitory computer readable storage medium as recited in claim 15, wherein in response to detecting the first instruction is the call instruction the program instructions are further operable to:
update a speculative copy of a stack pointer to point to a location on the call return stack storing the first return address; and
wait until the call instruction has been committed before updating a committed copy of a stack pointer to point to the location on the call return stack storing the first return address.

20. The non-transitory computer readable storage medium as recited in claim 15, wherein the program instructions are further operable to:
discard the speculative return address corresponding to a given instruction fetch of said every instruction fetch if the given instruction fetch does not include a return instruction; and
not access the call return stack if it is determined that the given instruction fetch does not include a call or return instruction.

* * * * *

UNITED STATES PATENT AND TRADEMARK OFFICE
CERTIFICATE OF CORRECTION

PATENT NO. : 10,338,928 B2
APPLICATION NO. : 13/112428
DATED : July 2, 2019
INVENTOR(S) : Shah et al.

Page 1 of 1

It is certified that error appears in the above-identified patent and that said Letters Patent is hereby corrected as shown below:

On the Title Page

In Column 2, under Attorney, Agent, or Firm, Line 2, delete "PC" and insert -- PC; Rory D. Rankin --, therefor.

In the Specification

In Column 7, Line 46, delete "(Firewire)" and insert -- (Firewire®) --, therefor.

In the Claims

In Column 24, Line 12, in Claim 1, after "instruction;" delete "and".

In Column 24, Line 30, in Claim 2, after "instruction;" insert -- and --.

Signed and Sealed this
Twenty-eighth Day of July, 2020

Andrei Iancu
*Director of the United States Patent and Trademark Office*